United States Patent
Martinou et al.

(10) Patent No.: US 8,413,925 B2
(45) Date of Patent: Apr. 9, 2013

(54) AIRCRAFT ENGINE ATTACHMENT PYLON HAVING A REAR ENGINE ATTACHMENT PROVIDED WITH A SELF-LOCKING NUT

(75) Inventors: Jean-Marc Martinou, L'Union (FR); Michael Berjot, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 12/596,085

(22) PCT Filed: Apr. 18, 2008

(86) PCT No.: PCT/EP2008/054754
§ 371 (c)(1),
(2), (4) Date: Oct. 15, 2009

(87) PCT Pub. No.: WO2008/132077
PCT Pub. Date: Nov. 6, 2008

(65) Prior Publication Data
US 2010/0147997 A1 Jun. 17, 2010

(30) Foreign Application Priority Data
Apr. 20, 2007 (FR) ..................... 07 54608

(51) Int. Cl.
*B64D 27/00* (2006.01)
(52) U.S. Cl.
USPC ................. 244/54; 244/55; 60/797; 248/554
(58) Field of Classification Search ............ 244/54, 244/55; 248/554–557; 60/796, 797
See application file for complete search history.

(56) References Cited

U.S. PATENT DOCUMENTS

| | | | | |
|---|---|---|---|---|
| 2,471,118 A * | 5/1949 | Patterson | ...................... | 244/54 |
| 3,831,888 A * | 8/1974 | Baker et al. | .................... | 244/54 |
| 4,634,081 A * | 1/1987 | Chee | .............................. | 244/54 |
| 4,717,094 A * | 1/1988 | Chee | .............................. | 244/54 |
| 4,725,019 A * | 2/1988 | White | ............................ | 244/54 |
| 4,805,851 A * | 2/1989 | Herbst | ........................... | 244/54 |
| 4,946,116 A * | 8/1990 | Vander Hoek | ................. | 244/54 |
| 6,059,227 A * | 5/2000 | Le Blaye et al. | ................ | 244/54 |
| 6,173,919 B1* | 1/2001 | Le Blaye | ........................ | 244/54 |
| 6,209,822 B1* | 4/2001 | Le Blaye | ........................ | 244/54 |
| 6,601,796 B2* | 8/2003 | Roszak | .......................... | 244/54 |
| 6,682,015 B2* | 1/2004 | Levert et al. | ................... | 244/54 |
| 6,758,438 B2* | 7/2004 | Brefort et al. | ................... | 244/54 |
| 6,843,449 B1* | 1/2005 | Manteiga et al. | ............... | 244/54 |
| 6,986,482 B2* | 1/2006 | Brefort et al. | ................. | 244/54 |

(Continued)

FOREIGN PATENT DOCUMENTS

| | | |
|---|---|---|
| EP | 1 266 826 | 12/2002 |
| FR | 2 770 486 | 5/1999 |
| FR | 2 887 851 | 1/2007 |

*Primary Examiner* — Timothy D Collins
*Assistant Examiner* — Steven Hawk
(74) *Attorney, Agent, or Firm* — Oblon, Spivak, McClelland, Maier & Neustadt, L.L.P.

(57) ABSTRACT

An aircraft engine attachment pylon including a rigid structure forming a caisson, and a rear engine attachment including an attachment body and at least one lateral fitting arranged on either side of the caisson. Each fitting includes a first portion pierced by first assembly holes enabling it to be fixed to the caisson, and a second portion defining a fixing surface of the body. The second portion includes a housing orifice receiving a self-locking nut cooperating with a screw supported against the body and, in transversal section, an axis of the screw passes through the first holes.

12 Claims, 3 Drawing Sheets

U.S. PATENT DOCUMENTS

| | | | |
|---|---|---|---|
| 7,325,770 B2 * | 2/2008 | Chevalier et al. | 244/54 |
| 2002/0104924 A1 * | 8/2002 | Roszak | 244/54 |
| 2003/0066928 A1 * | 4/2003 | Brefort et al. | 244/54 |
| 2003/0173456 A1 * | 9/2003 | Levert et al. | 244/54 |
| 2005/0035510 A1 * | 2/2005 | Steinbeck | 267/141 |
| 2008/0042007 A1 * | 2/2008 | Machado | 244/54 |
| 2008/0197233 A1 * | 8/2008 | Combes et al. | 244/54 |
| 2009/0200418 A1 * | 8/2009 | Beaufort | 244/54 |
| 2009/0266933 A1 * | 10/2009 | Foster | 244/54 |

* cited by examiner

AIRCRAFT ENGINE ATTACHMENT PYLON HAVING A REAR ENGINE ATTACHMENT PROVIDED WITH A SELF-LOCKING NUT

TECHNICAL FIELD

The present invention relates in general to an aircraft engine assembly, of the type comprising an engine, an attachment pylon and an engine-mounting system provided with a plurality of engine attachments and being interposed between a rigid structure of the attachment pylon and the engine.

The invention also relates to such an aircraft engine attachment pylon.

The invention can be used on any type of aircraft equipped for example with turbojet engines or of turboprop engines.

This type of attachment pylon, also known as "EMS" ("Engine Mounting Structure"), for example suspends a turboengine below the wing of the aircraft, or else mounts this turboengine above this same wing.

PRIOR ART

Such an attachment pylon is in fact provided to constitute the linkage interface between an engine such as a turbojet engine and a wing of the aircraft. It transmits to the structure of this aircraft the forces generated by its associated turbojet engine, and also allows flow of fuel, electrical systems, hydraulics, and air between the engine and the aircraft.

To ensure transmission of forces, the pylon comprises a rigid structure, often of the "caisson" type, that is, formed by assembling the upper and lower longerons and two lateral panels connected together by means of transversal grooves.

On the other hand, the pylon is fitted with an engine-mounting system interposed between the turbojet engine and the rigid structure of the pylon, this system comprising overall at least two engine attachments, generally front attachment and a rear attachment.

Also, the assembly system comprises a thrust force collection device generated by the turbojet engine. In the prior art, this device for example takes the form of two lateral connecting rods connected on the one hand to a rear part of the fan casing of the turbojet engine, and on the other hand to the rear engine attachment fixed on the casing of the latter.

In the same way, the attachment pylon also comprises a second assembly system interposed between the rigid structure of this pylon and the wing of the aircraft, this second system usually being composed of two or three attachments.

Finally, the pylon is provided with a secondary structure ensuring segregation and maintenance of systems while supporting aerodynamic faring.

In the embodiments of the prior art, the engine-mounting system comprises a rear engine attachment whereof the body is directly attached to the caisson by means of lateral fittings fixed to the caisson. These usually have a first portion pierced with assembly holes enabling it to be fixed onto a lateral panel of the caisson, and further comprise a second portion defining a fixing surface in contact with a fixing surface provided on the rear engine attachment body, such as described for example in document FR 2 887 851. The rear engine attachment is accordingly capable of ensuring thrust force collection according to the vertical direction.

With this type of embodiment, the second portion defining the fixing surface is generally displaced laterally relative to the caisson, to give adequate access to the operator, especially in light of placing bolts intended to pass through the two fixing surfaces in contact.

This configuration implies various disadvantages, including that associated with the introduction of parasite flexion torque in the caisson, according to the longitudinal direction, precisely due to offset in the transversal direction found between the first and second portions of the lateral fittings.

Also, the fact of providing the fixing surfaces of the rear engine attachment body outside the caisson and laterally relative thereto, for the abovementioned accessibility reasons, results in a rear engine attachment body extending laterally over a distance necessarily greater than that of the width of the caisson. Now, this configuration thus induces the lateral ends of the rear engine attachment body to constitute considerable obstacles in the flow zone of the secondary flow, and consequently causes substantial aerodynamic perturbation, causing drag, in turn leading to performance losses of the aircraft.

OBJECT OF THE INVENTION

The aim of the invention therefore is to propose an attachment pylon for aircraft engine at least partially rectifying the disadvantages mentioned hereinabove, relative to executions of the prior art.

For this to happen, the object of the invention is an aircraft engine attachment pylon, said pylon comprising a rigid structure forming caisson and an engine-mounting system mounted fixed on said rigid structure and comprising especially a rear engine attachment comprising an attachment body on which is articulated at least one shackle, the rear engine attachment having at least one lateral fitting arranged on either side of the caisson, each lateral fitting comprising a first portion pierced by first assembly holes for fixing to said caisson, and comprising a second portion defining a fixing surface in contact with a fixing surface provided on the rear engine attachment body.

According to the invention, said second portion has a housing orifice receiving a self-locking nut cooperating with a fixing screw supported against the rear engine attachment body, and, in any transversal section passing through said housing orifice, an axis of said fixing screw passes through said first assembly holes.

Therefore, the invention overall eliminates the lateral displacement found earlier between the first portion and the second portion of each lateral fitting.

In fact, in transversal section, a sort of alignment is provided, preferably in the vertical direction, between the housing orifice acting as connection to the attachment body, and the first assembly holes acting as connection to the caisson, even if these orifices/holes can be made according to different directions. This alignment, characterised by the fact that they are each penetrated by the axis of the fixing screw in transversal section or in opposite view, causes no longitudinal parasite torque linked to thrust force collection according to the vertical direction. These vertical forces can then transit successively through the rear engine attachment body, the fixing screw supported on the latter, the self-locking nut cooperating with the fixing screw, the lateral fitting housing the self-locking nut, then finally the caisson bearing the lateral fitting.

Also, still due to the absence of offset between the first and second portions of each lateral fitting, the proposed invention offers an advantage in terms of aerodynamic performance, given that the lateral ends of the rear engine attachment body no longer need to be extended laterally as widely as in the prior art. In this respect, it is noted that the adopted design places the fixing surfaces at least in part under the caisson, thus under the lower longeron, and no longer exclusively laterally relative to the latter. Aerodynamic perturbation to the right of the rear engine attachment is thus reduced.

Said rigid structure forming a caisson preferably has two lateral panels and a longeron facing the rear engine attachment body, said longeron comprising two lateral wings mounted fixed respectively on said two lateral panels, and said first portion of each of said two lateral fittings of the rear attachment is interposed between one of said two lateral wings and its associated lateral panel. In other words, the lateral fitting is advantageously plated on either side between the two above-mentioned elements, preferably by being in contact with each of them, also allowing the assembly means passing through the first holes of the lateral fitting to be stressed in double shear, for better introduction of forces into the caisson.

Said longeron preferably comprises a reinforcement for housing each first portion, which advantageously keeps the associated lateral panel substantially plane, despite the presence of these lateral fittings. This obviously is of particular interest in aerodynamic terms.

Said housing orifice receiving the self-locking nut is preferably arranged fully externally relative to the rigid structure forming a caisson, between the latter and said rear engine attachment body, specifically under the lower longeron of caisson in the non-limiting case where the engine is intended to be suspended under the wing of the aircraft. However, this housing orifice placed under the lower longeron could protrude laterally from the caisson, thus protrude laterally relative to its associated lateral panel of caisson, without departing from the scope of the invention.

Regardless, its placement below the lower longeron, thus externally relative to the caisson, allows easy access for an operator during assembly of the engine on the attachment pylon.

So, in the event where the engine is intended to be suspended under the wing of the aircraft, and where said caisson is formed by assembly of an upper longeron, a lower longeron, two lateral panels and transversal grooves connecting said longerons and panels, said fixing surface and said rear engine attachment body are located under and at a distance from the lower longeron.

Said rear engine attachment preferably further comprises at least one vertical shear slug passing through the attachment body, said shear slug being capable of ensuring thrust force collection exerted according to a transversal direction of said pylon.

The fixing surface of each of the lateral fittings of the rear attachment preferably takes the form of a flat surface oriented according to a plane defined by the transversal direction and a longitudinal direction of the pylon.

Preferably, each of the two lateral fittings of the rear attachment is made monobloc, and preferably of titanium.

It is indicated that the rear attachment is preferably designed so as to define two half-fasteners, each capable of ensuring thrust force collection exerted according to a vertical direction of the pylon.

Another aim of the invention is an aircraft engine assembly comprising a pylon such as that just described, as well as an engine fixed on this pylon.

Finally, an aim is an aircraft comprising at least one such engine assembly.

Other advantages and characteristics of the invention will emerge from the following detailed non-limiting description.

BRIEF DESCRIPTION OF THE DRAWINGS

This description will be given with respect to the attached drawings, in which.

DETAILED DESCRIPTION OF PREFERRED EMBODIMENTS

Figure 1:
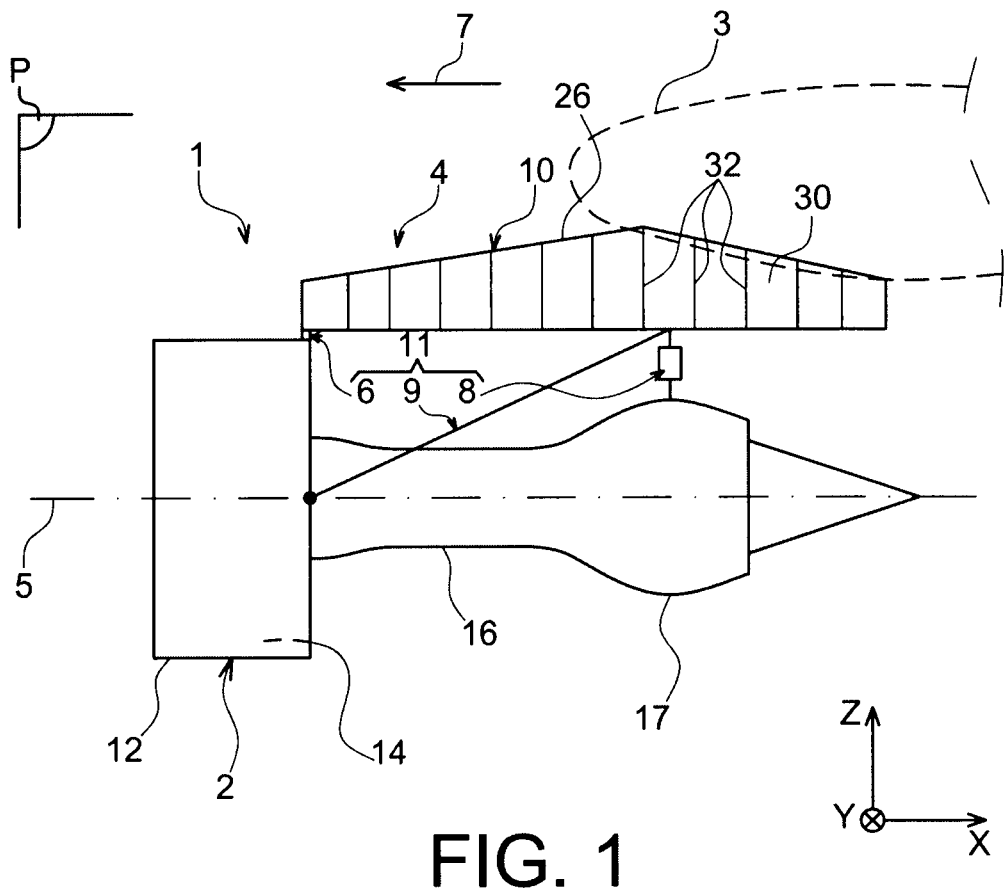
FIG. 1 illustrates a partially schematic side view of an aircraft engine assembly, comprising an attachment pylon according to a preferred embodiment of the present invention.

In reference to FIG. 1, this shows an aircraft engine assembly 1 to be fixed under a wing 3 of this aircraft, this assembly 1 forming an object of the present invention being provided with an attachment pylon 4 in the form of a preferred embodiment of the present invention.

Overall, the engine assembly 1 comprises an engine such as a turbojet engine 2 and the attachment pylon 4, the latter being especially fitted with a rigid structure 10 and an engine-mounting system 11 composed of a plurality of engine attachments 6, 8 and a thrust force collection device 9 generated by the turbojet engine 2, the assembly system 11 therefore being interposed between the engine and the abovementioned rigid structure 10, the latter also being called a primary structure. By way of indication, it is noted that the assembly 1 is intended to be enclosed by a nacelle (not shown in this figure), and that the attachment pylon 4 comprises another series of attachments (not shown) ensuring suspension of this assembly 1 under the wing of the aircraft.

Throughout the following description, by convention, X is called the longitudinal direction of the pylon 4 which is also equivalent to the longitudinal direction of the turbojet engine 2, this direction X being parallel to a longitudinal axis 5 of this turbojet engine 2. On the other hand, Y is called the direction oriented transversally relative to the pylon 4 and also equivalent to the transversal direction of the turbojet engine 2, and Z is called the vertical direction or of the height, these three directions X, Y and Z being orthogonal to one another.

On the other hand, the terms "front" and "rear" are to be considered relative to a direction of advance of the aircraft found following the thrust exerted by the turbojet engine 2, this direction being shown schematically by the arrow 7.

FIG. 1 shows that only the collection device 9, the engine attachments 6, 8, and the rigid structure 10 of the attachment pylon 4 are shown. The other constitutive elements, not shown, of this pylon 4, such as the attachment means of the rigid structure 10 under the wing of the aircraft, or even the secondary structure ensuring segregation and maintenance of the systems while supporting aerodynamic faring, are classic elements identical or similar to those encountered in the prior art, and known to the expert. Consequently, no detailed description thereof will be given.

The turbojet engine 2 has at the front of a large-size fan casing 12 delimiting an annular fan duct 14, and towards the rear comprises a central casing 16 of smaller size, enclosing the core of this turbojet engine. Finally, the central casing 16 extends to the rear via an ejection casing 17 of larger size than that of the casing 16. The casings 12, 16 and 17 are naturally joined together.

As evident from FIG. 1, the system 11 is constituted by a front attachment engine 6, a rear engine attachment 8 actually forming two rear half-fasteners, and an attachment 9 forming a thrust force collection device generated by the turboengine 2. As shown schematically in FIG. 1, this device 9 takes the form of two lateral connecting rods (one being visible due to the side view) connected on the one hand to a rear part of the fan casing 12, and on the other hand to a crossbar mounted on the rear attachment 8. An alternative could consist of mounting this rudder bar at a point distinct from that of the rear engine attachment, without departing from the scope of the invention.

The front attachment engine 6 is attached to the fan casing 12, and is designed to be able to absorb forces generated by the turbojet engine 2 according to the directions Y and Z, by means of shackles/connecting bars. By way of indication, this front attachment 6 preferably penetrates a circumferential end portion of the fan casing 12.

The rear engine attachment 8 constitutes a particular feature of the invention and will be specified in greater detail in reference to the following figures. It is overall interposed between the ejection casing 17 and the rigid structure 10 of the pylon. As such it is designed to form two half-fasteners placed symmetrically relative to a plane P defined by the axis 5 and the direction Z, each of these half-fasteners being designed to be able to absorb forces generated by the turbojet engine 2 according to the direction Z, but not those exerted according to the directions X and Y. However, this rear attachment can also be capable of absorbing, with a more central portion, forces generated by the turbojet engine 2 according to the direction Y, such as shown in FIG. 2.

Figure 2:
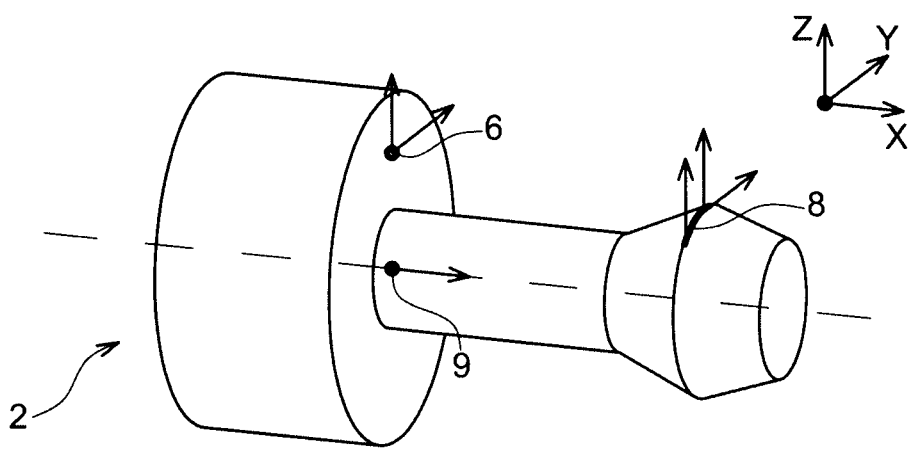
FIG. 2 illustrates a view outlining thrust force collection made by each of the engine attachments of the assembly shown in FIG. 1.

In this way, as shown schematically in FIG. 2, thrust force collection exerted according to the direction X is performed by means of the device 9, while thrust force collection exerted according to the direction Y is performed by means of the front attachment 6 and of the central portion of the rear attachment, and thrust force collection exerted according to the direction Z is performed conjointly by means of the front attachment 6 and the two rear half-fasteners.

On the other hand, absorbing the torque exerted according to the direction X is performed vertically by means of the two half-fasteners of the attachment 8, absorbing the torque exerted according to the direction Y is performed vertically by means of the two half-fasteners of the attachment 8 conjointly with the attachment 6, and absorbing the torque exerted according to the direction Z is performed transversally by means of the central portion of the attachment 8, conjointly with the attachment 6.

Again in reference to FIG. 1, it is evident that the structure 10 has the form of a caisson extending in the direction X, this caisson also being called torsion caisson. It is classically formed by an upper longeron 26 and a lower longeron 28, and by two lateral panels 30 (only one shown in FIG. 1) both extending according to the direction X and substantially in a plane XZ. Inside this caisson, transversal grooves 32 arranged according to planes YZ and longitudinally spaced reinforce the rigidity of the caisson. It is noted by way of indication that the elements 26, 28 and 30 can each be made monobloc, or else by assembling linking sections, which can optionally be slightly inclined relative to each other. However, one of the particular features here is that the lower longeron 28 extends in a plane inclined relative to the horizontal, over its entire length, as shown in FIG. 1. The inclination is such that the lower longeron 28, parallel to the direction Y, moves closer to the axis 5 by going rearwards with the aim of moving closer to the ejection casing 17 so as to place the rear engine attachment 8.

In reference to FIGS. 3 to 6, these show the rear engine attachment 8 whereof some elements have been voluntarily omitted, for clarity.

The part of the attachment 8 forming the two half-fasteners rear ensuring each uniquely thrust force collection exerted according to the direction Z, and being arranged symmetrically relative to the abovementioned plane P will be described first.

Since the two rear half-fasteners are therefore identical, only the right one viewed from the rear to the front, will be detailed hereinbelow. Overall, the latter comprises a lateral fitting 34 preferably having a plane of symmetry oriented according to the directions Y and Z, this fitting 34 being attached fixed and directly on the outer surface of the associated lateral panel 30 of the caisson, to be described later.

The fitting 34 extends vertically on the lateral panel 30 on which it is connected fixed by bolting/fish-plating, and extends down beyond the lower longeron 28, in the direction of the engine. It thus terminates in overhang by defining a fixing surface 38 in contact with a fixing surface 40 provided on a body 42 of the rear engine attachment, equivalent to a transversal beam made monobloc.

The surfaces in contact 38 and 40, arranged at a distance from the lower longeron 28 in the direction of the engine, constitute a fixing interface taking the form of a flat surface oriented according to a plane XY.

Each lateral fitting 34, preferably made monobloc and from titanium, is therefore fixed to the rear attachment body 42 placed transversally below and at a distance from the lower longeron 28. This body 42, having also the plane P as plane of symmetry, is therefore in contact with the two coplanar fixing surfaces 38 arranged on either side of the caisson, by means of its two fixing surfaces 40 also coplanar, respectively in contact and opposite in pairs with the surfaces 38.

The body 42 comprises a clevis 50 forming an integral part of the right rear half-fastener, on which a shackle 52 is articulated by means of an axis 54 oriented according to the direction X. By way of indication, a second axis 56 likewise oriented according to the direction X is also provided at the level of a lower end of the shackle 52, so as to articulate the latter on a fitting/clevis (not shown) attached to the casing of the turbojet engine 2. Consequently, it can therefore be understood that each rear half-fastener comprises the articulated shackle 52, the clevis 50 and the fitting 34, the two clevises 50 of the two half-fasteners also being connected within the same rear attachment body 42, preferably made monobloc.

It emerges from the preceding description that the rear attachment 8 forms two half-fasteners, each capable of ensuring thrust force collection exerted according to the direction Z. Now, in a preferred embodiment of the present invention it is provided that the rear attachment 8 is also capable of ensuring thrust force collection exerted according to the direction Y.

Figure 3:
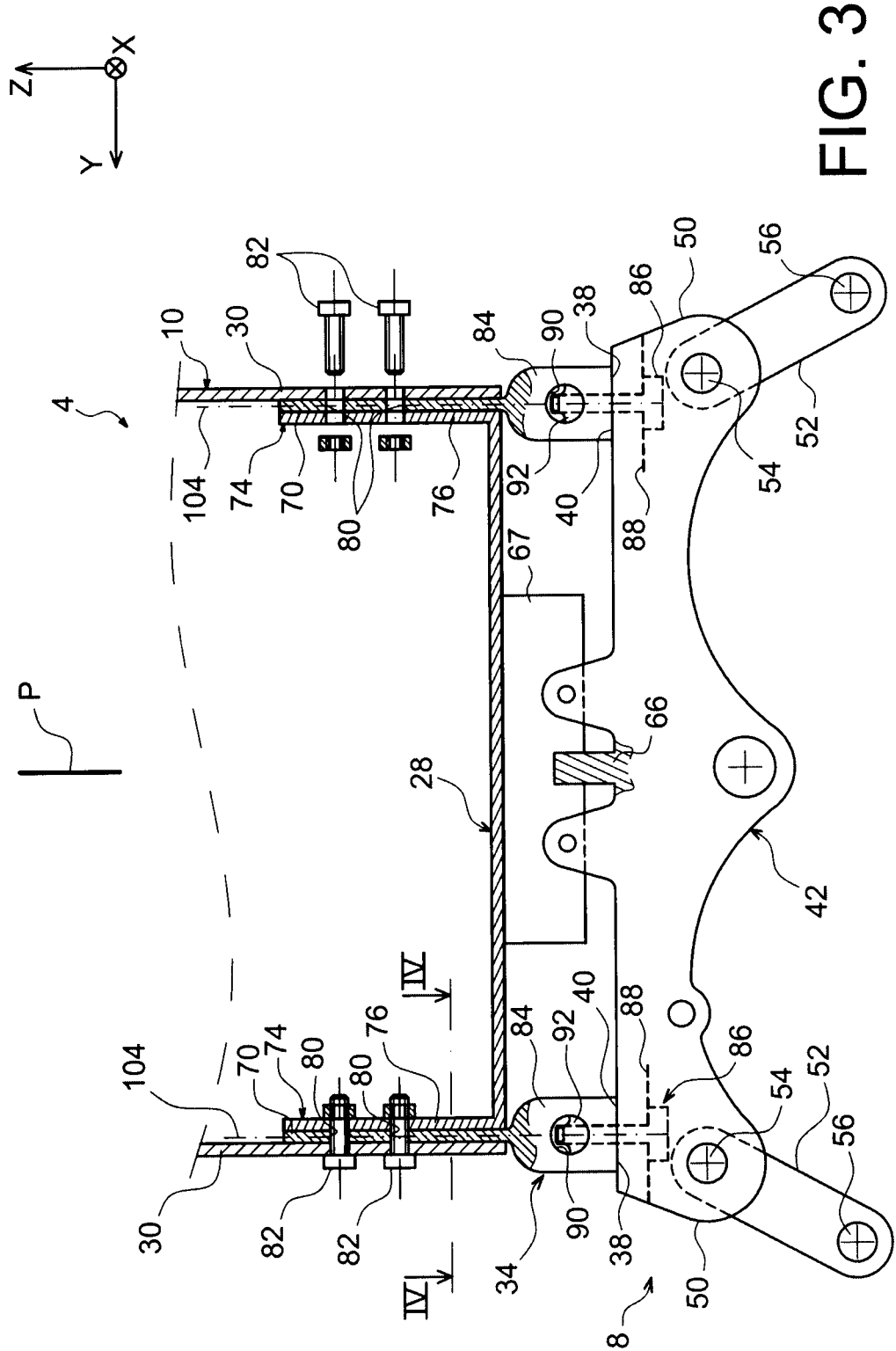
FIG. 3 illustrates a partial view in transversal section of the pylon shown in FIG. 1.
Figure 4:
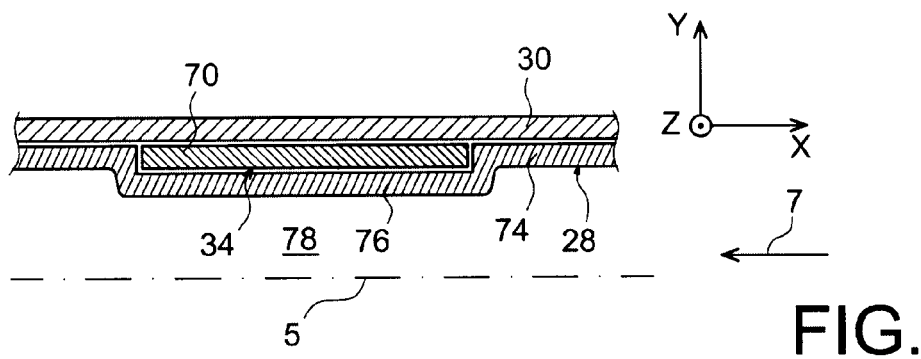
FIG. 4 illustrates a sectional view along the line IV-IV of FIG. 3.

For this to happen, more precisely in reference to FIG. 3, it is provided that the rear engine attachment 8 also comprises a shear slug 66 oriented according to the direction Z, this pin 66 being provided to ensure thrust force collection exerted according to a direction Y, and more particularly to enable these forces to pass between the rear attachment body 42 and the rigid structure 10 of the attachment pylon. For this to happen, the slug 66 can be housed on the one hand in an orifice of the beam 42, and on the other hand in a platen 67 connected fixed under the lower longeron 28, and preferably penetrated by the plane P.

Figure 5:
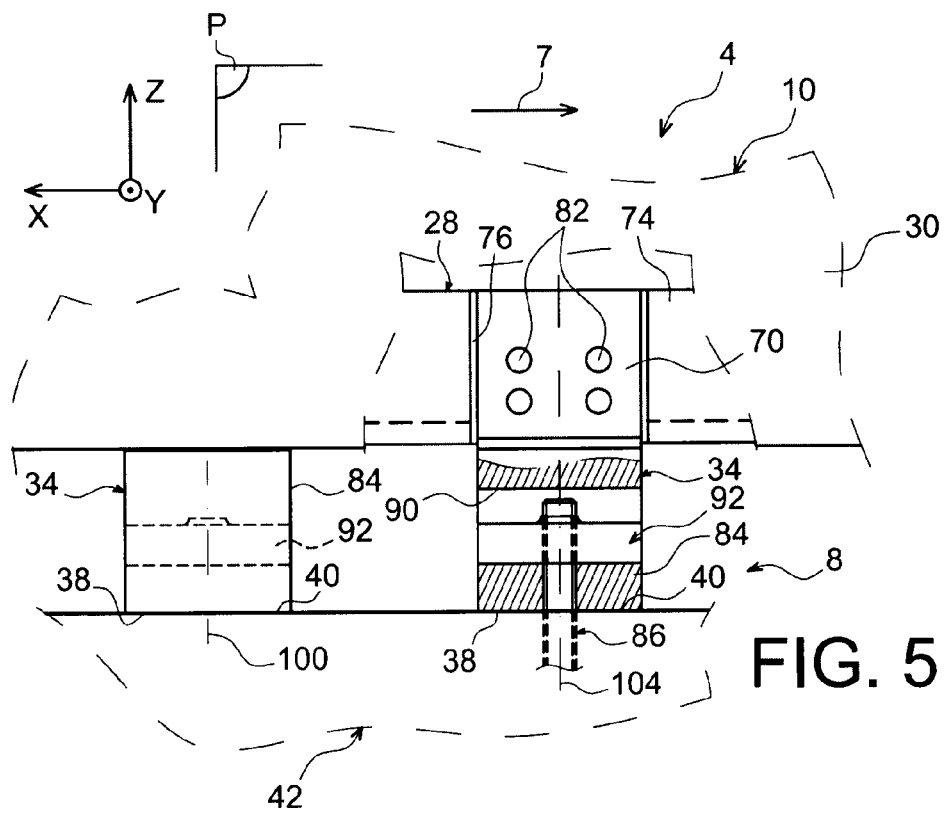
FIG. 5 illustrates a partial side view of the pylon shown in the preceding figures.
Figure 6:
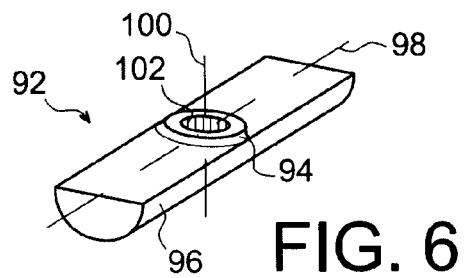
FIG. 6 illustrates a self-locking nut belonging to the rear engine attachment of the pylon shown in the preceding figures.

One of the particular features of the present invention is the design of the lateral fittings 34, which will now be detailed. In this respect, it is possible to ensure that each rear half-fastener comprises two fittings 34 substantially identical and offset longitudinally relative to one another, such as shown in FIG. 5.

Each lateral fitting 34 first comprises a first portion or upper portion 70, overall gripped between the lateral panel 30 and the longeron 28, and more precisely a lateral wing 74 of the latter. By way of indication, it is known to the expert that this wing 74 is also substantially oriented according to a plane XZ so as to permit contact and assembly of the lateral panel 30 on this longeron 28, for example by riveting or fish-plating.

This first portion 70 is preferably flat, and thus oriented according to a plane parallel to that of the associated panel 30, specifically preferably according to a plane XZ. It extends vertically downwards until it terminates outside the caisson from which it projects. This portion 70 overall takes the form of a plate, preferably of minimal thickness.

To keep the lateral panel 30 substantially flat despite the presence of the fitting 34 between this panel and the wing 74 of the longeron 28, the latter comprises a reinforcement 76 thus serving to house the first portion 70 of the fitting 34. It is therefore the inner face of the first portion 70 which is in contact with the reinforcement 76 defined by the wing 74 of the lower longeron, this wing portion being thus slightly closer to a longitudinal central axis of the caisson. In this respect, it is noted that the two reinforcements 76 provided respectively at the level of the two rear half-fasteners are preferably opposite one another, and conjointly form a construction 78 of the longeron 28, according to the direction Y. The interior of the reinforcement 76 is preferably substantially plane to be able to best contact the plane inner surface of the first portion 70. Also, as many reinforcements 76 as fittings 34 are preferably provided, specifically preferably two on either side of the pylon.

To ensure fixing of the superposed three elements 30, 70, 74, the portion 70 is equipped with a plurality of first assembly holes 80 passing through it, and intended to be penetrated by conventional assembly means such as bolts 82, of axes parallel to the direction Y, specifically orthogonal to the planes according to which the three abovementioned superposed elements 30, 70, 74 extend parallel. More generally, irrespective of the design kept for attaching the portion 70 to the caisson, the assembly holes 80 are penetrated by said conventional assembly means, such as bolts 82, intended to be submitted to shearing forces.

The bolts 82 naturally also extend through corresponding continuous orifices arranged on the two external elements 30, 74 of the superposition. As evident in FIG. 5, it is for example provided four bolts 82 passing through respectively four first assembly holes arranged in a square or rectangle on the first gripped portion 70.

The portion 70 extends down approximately from the outer surface of the longeron 28 via a second portion 84 whereof the lower end defines the fixing surface 38.

To ensure fixing of the attachment body 42 on the lateral fitting 34, a fixing screw 86 is employed, preferably oriented vertically. This screw 86 has a head oriented downwards, supported against a lower surface 88 of the upper part of the beam 42. It extends up by successively passing through the upper part of the beam 42, the two fixing surfaces 38, 40 in contact with one another, and a lower part of the second portion 84, each provided with a vertical bore provided to this effect. Next, the screw 86 has its threaded end part which terminates in an orifice housing 90 made in the portion 84, according to a direction arranged in a plane XY, such as for example the direction X, as shown. Of course, this assembly is enabled by making sure that the bore provided in the lower part of the portion 84 terminates in the orifice 90, housing a self-locking nut 92.

In fact, in the orifice 90 of circular transversal section, a self-locking nut 92 is provided with deformed collar 94 ensuring that the screw 86 is lock-screwed in this nut, the latter taking any classic form known to the expert. It is recalled that a self-locking nut is generally a nut which has an outer cylindrical surface 96 whereof the axis 98 (FIG. 6) is perpendicular to the axis 100 of the threaded hole 102 which passes through it, this axis 100 in the relevant assembly being combined with the vertical axis 104 of the screw 86. A self-locking nut can be made, according to the case, of one or two pieces. In the second case, it comprises a floating nut, mounted in a housing formed in a cylindrical nut support.

So, the self-locking nut 92, blocked by the orifice 90 in rotation and in translation according to the axis 100 of the threaded hole 102, allows easy assembly of the screw 86 to be screwed into this same threaded hole 102 extending via the deformed collar 94, elliptically for example, to allow blockage in rotation according to the direction Z of this screw 86.

One of the particular features associated with this assembly is therefore that the self-locking nut 92 is located externally relative to the caisson 10, such that its access poses no particular problem to operators. In this respect, provision is made for easy extraction of this nut 92 lodged in the orifice 90, such that this nut is situated fully outside the lower longeron 28, in the direction Z and downwards. The nut 92 is consequently located sufficiently disengaged from the caisson to allow it to easily be removed from the orifice 90, indifferently terminating or passing through. In such a case, it suffices simply to remove the screw 86 to then extract the nut 92 by sliding it from its housing 90.

As shown in FIGS. 3 and 5, it is preferably ensured that the entire receiving orifice 90 provided for housing the self-locking nut 92 is fully located in the direction Z and downwards beyond the lower longeron 28, between the latter and the beam 42.

To avoid introducing parasite flexion torque to the caisson, it is ensured that in any transversal section passing through the housing orifice 90, or in opposite view, the preferably vertical axis 104 of the fixing screw 86 passes through each of the first assembly holes 80 of the fitting 34 associated with this screw. This specificity is shown in FIG. 3 whereof part is in transversal section and the other in opposite view, the angle of view of the pylon being the same. Penetration of holes 80 by the axis 104 is of course done arbitrarily, preferably orthogonally to the axes of these holes 80 oriented according to the direction Y.

By way of indication, in side elevation such as shown in FIG. 5, the axis 104 does not forcibly pass through these orifices which can be arranged on either side of this axis 104, for example arranged symmetrically relative to the latter.

Of course, various modifications can be made by the person skilled in the art to the attachment pylon 4 for an aircraft turbojet engine 2 which has just been described, solely by way of non-limiting example. In this respect, it can especially be indicated whether the pylon 4 has been shown in a configuration adapted for it to be suspended under the wing of the aircraft, this pylon 4 could also be in a different configuration allowing it to be mounted above this same wing.

The invention claimed is:

1. An attachment pylon for an aircraft engine, the pylon comprising:
a rigid structure forming a caisson; and
a mounting system of the engine mounted fixed on the rigid structure and comprising a rear engine attachment comprising an attachment body on which is articulated at least one shackle, the rear engine attachment also comprising at least one lateral fitting arranged on either side of the caisson, each lateral fitting comprising a first portion pierced by first assembly holes to enable the lateral fitting to be fixed to the caisson, and comprising a second portion defining a fixing surface in contact with a fixing surface provided on the rear engine attachment body, wherein the second portion includes a housing orifice receiving a self-locking nut cooperating with a fixing screw supported against the rear engine attachment body, and in any transversal section passing through the housing orifice, a longitudinal axis of the fixing screw passes through the first assembly holes.

2. An attachment pylon for an aircraft engine, the pylon comprising:

a rigid structure forming a caisson; and a mounting system of the engine mounted fixed on the rigid structure and comprising a rear engine attachment comprising an attachment body on which is articulated at least one shackle, the rear engine attachment also comprising at least one lateral fitting arranged on either side of the caisson, each lateral fitting comprising a first portion pierced by first assembly holes to enable the lateral fitting to be fixed to the caisson, and comprising a second portion defining a fixing surface in contact with a fixing surface provided on the rear engine attachment body, wherein the second portion includes a housing orifice receiving a self-locking nut cooperating with a fixing screw supported against the rear engine attachment body, and in any transversal section passing through the housing orifice, a longitudinal axis of the fixing screw passes through the first assembly holes, wherein the rigid structure forming a caisson comprises two lateral panels and a longeron facing the rear engine attachment body, the longeron comprising two lateral wings mounted fixed respectively on the two lateral panels, and the first portion of each of the two lateral fittings of the rear attachment is interposed between one of the two lateral wings and its associated lateral panel.

3. The attachment pylon as claimed in claim 2, wherein the longeron comprises a reinforcement for housing each first portion.

4. An attachment pylon for an aircraft engine, the pylon comprising:

a rigid structure forming a caisson; and a mounting system of the engine mounted fixed on the rigid structure and comprising a rear engine attachment comprising an attachment body on which is articulated at least one shackle, the rear engine attachment also comprising at least one lateral fitting arranged on either side of the caisson, each lateral fitting comprising a first portion pierced by first assembly holes to enable the lateral fitting to be fixed to the caisson, and comprising a second portion defining a fixing surface in contact with a fixing surface provided on the rear engine attachment body, wherein the second portion includes a housing orifice receiving a self-locking nut cooperating with a fixing screw supported against the rear engine attachment body, and in any transversal section passing through the housing orifice, a longitudinal axis of the fixing screw passes through the first assembly holes, wherein the housing orifice receiving the self-locking nut is arranged entirely externally relative to the rigid structure forming a caisson, between the caisson and the rear engine attachment body.

5. The attachment pylon as claimed in claim 1, wherein the caisson is formed by assembling an upper longeron, a lower longeron, two lateral panels, and transversal grooves connecting the longerons and panels, the fixing surface and the rear engine attachment body being located under and at a distance from the lower longeron.

6. The attachment pylon as claimed in claim 1, wherein the rear engine attachment further comprises at least one vertical shear slug passing through the attachment body, the shear slug being capable of ensuring thrust force collection exerted according to a transversal direction of the pylon.

7. The attachment pylon as claimed in claim 1, wherein the fixing surface of each of the lateral fittings of the rear engine attachment takes a form of a surface plane oriented according to a plane defined by a transversal direction and a longitudinal direction of the pylon.

8. The attachment pylon as claimed in claim 1, wherein the rear engine attachment defines two half-fasteners each capable of ensuring thrust force collection exerted according to a vertical direction of the pylon.

9. An aircraft engine assembly comprising:

an attachment pylon as claimed in claim 1; and an engine mounted fixed on the pylon.

10. An aircraft comprising at least one engine assembly as claimed in claim 9.

11. The attachment pylon as claimed in claim 1, wherein the lateral fitting is fixed to the caisson by bolts in said first assembly holes, and wherein said bolts are oriented perpendicular to said fixing screw.

12. The attachment pylon as claimed in claim 1, wherein the lateral fitting is fixed to the caisson by assembly devices in said first assembly holes, said assembly devices extending along a direction oriented transversally relative to said attachment pylon, and wherein said fixing screw extend along a vertical direction.

* * * * *